(12) United States Patent
Kani et al.

(10) Patent No.: US 11,027,344 B2
(45) Date of Patent: Jun. 8, 2021

(54) CUTTING DEVICE

(71) Applicant: MAKITA CORPORATION, Anjo (JP)

(72) Inventors: Toshiyuki Kani, Anjo (JP); Yukinori Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/346,893

(22) PCT Filed: Nov. 30, 2017

(86) PCT No.: PCT/JP2017/043119
§ 371 (c)(1),
(2) Date: May 2, 2019

(87) PCT Pub. No.: WO2018/105494
PCT Pub. Date: Jun. 14, 2018

(65) Prior Publication Data
US 2020/0055131 A1 Feb. 20, 2020

(30) Foreign Application Priority Data
Dec. 5, 2016 (JP) ................ JP2016-235734

(51) Int. Cl.
*B23D 45/04* (2006.01)
*B23D 47/02* (2006.01)
(Continued)

(52) U.S. Cl.
CPC ........... *B23D 45/048* (2013.01); *B23D 47/02* (2013.01); *B27B 5/206* (2013.01); *B27B 5/29* (2013.01);
(Continued)

(58) Field of Classification Search
CPC ............. Y10T 83/7693; Y10T 83/7697; Y10T 83/7701; Y10T 83/7705; Y10T 83/8773;
(Continued)

(56) References Cited

U.S. PATENT DOCUMENTS 4,555,849 A * 12/1985 Ando .................. B27B 9/00
30/388
5,357,834 A * 10/1994 Ito .................. B23D 45/044
83/471.3
(Continued)

FOREIGN PATENT DOCUMENTS

CN 201124267 Y 10/2008
CN 201776517 U 3/2011
(Continued)

OTHER PUBLICATIONS

Feb. 20, 2018 Written Opinion issued in International Patent Application No. PCT/JP2017/043119.
(Continued)

*Primary Examiner* — Phong H Nguyen
(74) *Attorney, Agent, or Firm* — Oliff PLC

(57) ABSTRACT

A cutting device main body with a saw blade in a tabletop cutting device, supported so as to be swingable in an up-to-down direction with respect to a table on which material to be cut is placed, aims to improve operability for attaching and detaching the battery. A sliding direction for attaching and detaching the battery is set to be a tilting direction angled with respect to an up-to-down moving direction of the cutting device main body in a surface direction of a cutting blade. Because of this configuration, all of an operation force for attaching and detaching the battery is not applied to the up-to-down moving direction of the cutting device main body. As a result, the cutting main body is not moved in an easy manner and operability for attaching and detaching the battery is improved.

12 Claims, 16 Drawing Sheets

(51) Int. Cl.
*B27B 5/20* (2006.01)
*B27B 5/29* (2006.01)
(52) U.S. Cl.
CPC ........ *Y10T 83/7693* (2015.04); *Y10T 83/7701* (2015.04)
(58) Field of Classification Search
CPC ........ B23D 45/04; B23D 45/02; B23D 45/14; B23D 45/021; B23D 45/024; B23D 45/025; B23D 45/028; B23D 45/042; B23D 45/044; B23D 45/046; B23D 45/048; B23D 47/02; B23D 47/04; B27B 5/206; B27B 5/29; B27B 9/00; B27B 9/02; B27B 9/04
See application file for complete search history.

(56) References Cited

U.S. PATENT DOCUMENTS

| | | | |
|---|---|---|---|
| 9,827,622 B2 | 11/2017 | Kani et al. | |
| 10,099,302 B2 | 10/2018 | Kani et al. | |
| 10,286,462 B2* | 5/2019 | Nishikawa | B25F 5/00 |
| 2002/0170404 A1* | 11/2002 | Peot | B27G 19/02 |
| | | | 83/478 |
| 2009/0151529 A1* | 6/2009 | Miura | B23D 47/126 |
| | | | 83/471.3 |
| 2013/0097878 A1 | 4/2013 | Naito et al. | |
| 2014/0084718 A1 | 3/2014 | Naito et al. | |
| 2015/0059548 A1* | 3/2015 | Kani | B23D 45/048 |
| | | | 83/473 |
| 2015/0375313 A1* | 12/2015 | Kani | B23D 47/025 |
| | | | 83/471.2 |
| 2016/0243631 A1 | 8/2016 | Brewster et al. | |
| 2017/0334004 A1 | 11/2017 | Kani et al. | |
| 2018/0161891 A1 | 6/2018 | Nishikawa | |
| 2019/0009351 A1 | 1/2019 | Kani et al. | |
| 2019/0262916 A1 | 8/2019 | Nishikawa | |

FOREIGN PATENT DOCUMENTS

| | | |
|---|---|---|
| CN | 205183934 U | 4/2016 |
| CN | 107635734 A | 1/2018 |
| EP | 2762282 A1 | 8/2014 |
| JP | H05-318401 A | 12/1993 |
| JP | H09-300309 A | 11/1997 |
| JP | 2000-308268 A | 11/2000 |
| JP | 2010-280013 A | 12/2010 |
| JP | 2014-79812 A | 5/2014 |
| JP | 2014-79873 A | 5/2014 |
| JP | 2014-144508 A | 8/2014 |
| JP | 2014-148023 A | 8/2014 |
| JP | 2014-161970 A | 9/2014 |
| JP | 2014-166745 A | 9/2014 |
| WO | 2014/119132 A1 | 8/2014 |
| WO | 2016/194536 A1 | 12/2016 |

OTHER PUBLICATIONS

Feb. 20, 2018 International Search Report issued in International Patent Application No. PCT/JP2017/043119.
Jul. 31, 2020 Office Action issued in Japanese Patent Application No. 2016-235734.
Nov. 24, 2020 Office Action issued in Chinese Patent Application No. 201780075583.6.

* cited by examiner

CUTTING DEVICE

The present application is a U.S. National Phase entry of, and claims priority to, PCT Application No. PCT/JP2017/043119, filed Nov. 30, 2017 which claims priority of Japanese Patent Application No. 2016-235734, filed Dec. 5, 2016, both of which are incorporated herein by reference in their entireties for all purposes.

TECHNICAL FIELD

The present invention relates to a cutting device for tabletop or stationary use, which is used for cutting materials, such as wood or metal, by swinging a cutting device main body in generally an up-to-down direction.

BACKGROUND ART

Electric power tools used for cutting a material to be cut such as, for example, a pipe made from metal include a stationary cutting device used for cutting metal (the device is generally referred to as a so-called "cutting device"). The stationary cutting device is a device used for cutting a material placed on a base of the device by swinging a disc-shaped cutting whetstone or a circular saw blade in a downward direction while the cutting device is placed on a floor surface. Furthermore, electric power tools used for cutting wood or the like include a tabletop cutting device (generally referred to as a so-called "tabletop circular saw" or "sliding miter saw" in the market). The tabletop cutting device is a device used for cutting a material that is placed on a table of the cutting device by swinging the circular saw blade in the downward direction while the cutting device is placed on the table or other surface. There is no clear definition for "a stationary cutting device" and "a tabletop cutting device." However, an expression of "a stationary or tabletop cutting device" is used in the present description in order to include at least the above-described cutting device groups. These types of cutting devices include a table on which the material to be cut is placed and also a cutting device main body that is supported at a rear part of the table, so as to be movable in the generally up-to-down direction. The cutting device main body includes a circular cutting blade (cutting tool) that is rotated using an electric motor as a driving source. Cutting work can be performed by moving the cutting device main body in a downward direction and causing the rotating cutting blade to cut into the material placed on the table.

Some of these cutting devices can be operated by use of a rechargeable battery.

Japanese Laid-Open Patent Publication No. 2000-308268 and Japanese Laid-Open Patent Publication No. 2014-148023 each discloses a tabletop cutting device that can be operated for a long time and/or with high power by attaching two batteries. Especially, the latter discloses various arrangement configurations of the two batteries.

However, in the above-described existing tabletop cutting devices, an attaching and detaching direction of the batteries is parallel to the cutting blade, i.e., coincides with an up-to-down moving direction of the cutting device main body. Thus, the cutting device main body may move in the up-to-down direction while the batteries are being attached to or detached from the cutting device main body. In this respect, it is necessary to improve operability when the batteries are being attached and detached. The present invention aims to improve operability when the batteries are being attached and detached to and from the device.

BRIEF SUMMARY

The above problems can be solved by each of the embodiments described below. A first embodiment is relate to a cutting device for tabletop or stationary use in which a cutting device main body is provided so as to be movable in an up-to-down direction with regard to a table on which a material to be cut is placed. The cutting device main body includes a circular cutting blade that is rotated by a drive section having an electric motor as a drive source. Furthermore, the first embodiment is relate to a cutting device in which a slide-attachment type battery serving as a power source is attachable to the cutting device main body, a sliding direction of the battery being angled with respect to the cutting blade.

According to the first embodiment, the sliding direction for attaching and detaching the battery is angled with respect to the cutting blade. The sliding direction is non-parallel to, but angled with respect to, an up-to-down moving direction of the cutting device main body. As a result, the cutting device main body is not easily moved in the up-to-down direction when the battery is being attached or detached. Thus, the ease of attaching and detaching the battery is improved.

A second embodiment is relate to the cutting device of the first embodiment, adding that a sliding direction for attaching the battery is obliquely tilted in a downward direction.

According to the second embodiment, the cutting device main body is not easily moved in the downward direction when the battery is being attached. Thus, ease of attaching the battery is improved.

A third embodiment is relate to the cutting device according to the first embodiment, adding that the battery is attached on the drive section side with respect to the cutting blade, and the sliding direction for attaching the battery is tilted downward from the cutting blade toward the drive section.

According to the third embodiment, the battery is attached on the drive section side with respect to the cutting blade, and thus a space on an opposite side to the drive section side (anti-drive section side) with respect to the cutting blade can be obtained. Furthermore, the sliding direction for attaching the battery is tilted downward from the cutting blade side to the drive section side, and thus an upper portion of the battery, which is disposed closer to the cutting blade, can be positioned at a higher position. Because of this configuration, interference of the battery with respect to, for example, a carrying handle or a dust collection nozzle, which are provided on the sides of the cutting blade, can be prevented.

A fourth embodiment is relate to the cutting device according to the first embodiment, adding that the sliding direction of the battery is configured to be misaligned with regard to a motor axis of the electric motor, and a portion of the battery is positioned above a motor housing of the electric motor, even if the cutting device main body is tilted.

According to the fourth embodiment, interference by the battery with the material to be cut or a poisoning fence used for positioning the material is prevented when the cutting device main body is tilted. Thus, the cutting device main body can be tilted by a larger angle.

A fifth embodiment is relate to the cutting device according to the first embodiment, adding that the electric motor is positioned such that a motor axis of the electric motor is tilted with regard to a rotation axis of the cutting blade, and a thickness direction of the battery is parallel to the motor axis or within an angle range between the parallel direction and a vertical direction.

According to the fifth embodiment, interference by the battery with the material to be cut or a poisoning fence used for positioning the material is prevented when the cutting device main body is tilted, and thus the cutting device main body can be tilted by a larger angle, which is similar to the benefit of the fourth embodiment.

A sixth embodiment is relate to the cutting device according to the first embodiment, adding that a plurality of batteries are attachable to the cutting device main body such that the plurality of the batteries are arranged side by side in a front-to-rear direction when attached.

According to the sixth embodiment, a larger power source can be used, while a larger space for attaching the plurality of batteries is not necessary in a left-to-right direction.

DETAILED DESCRIPTION

Figure 1:
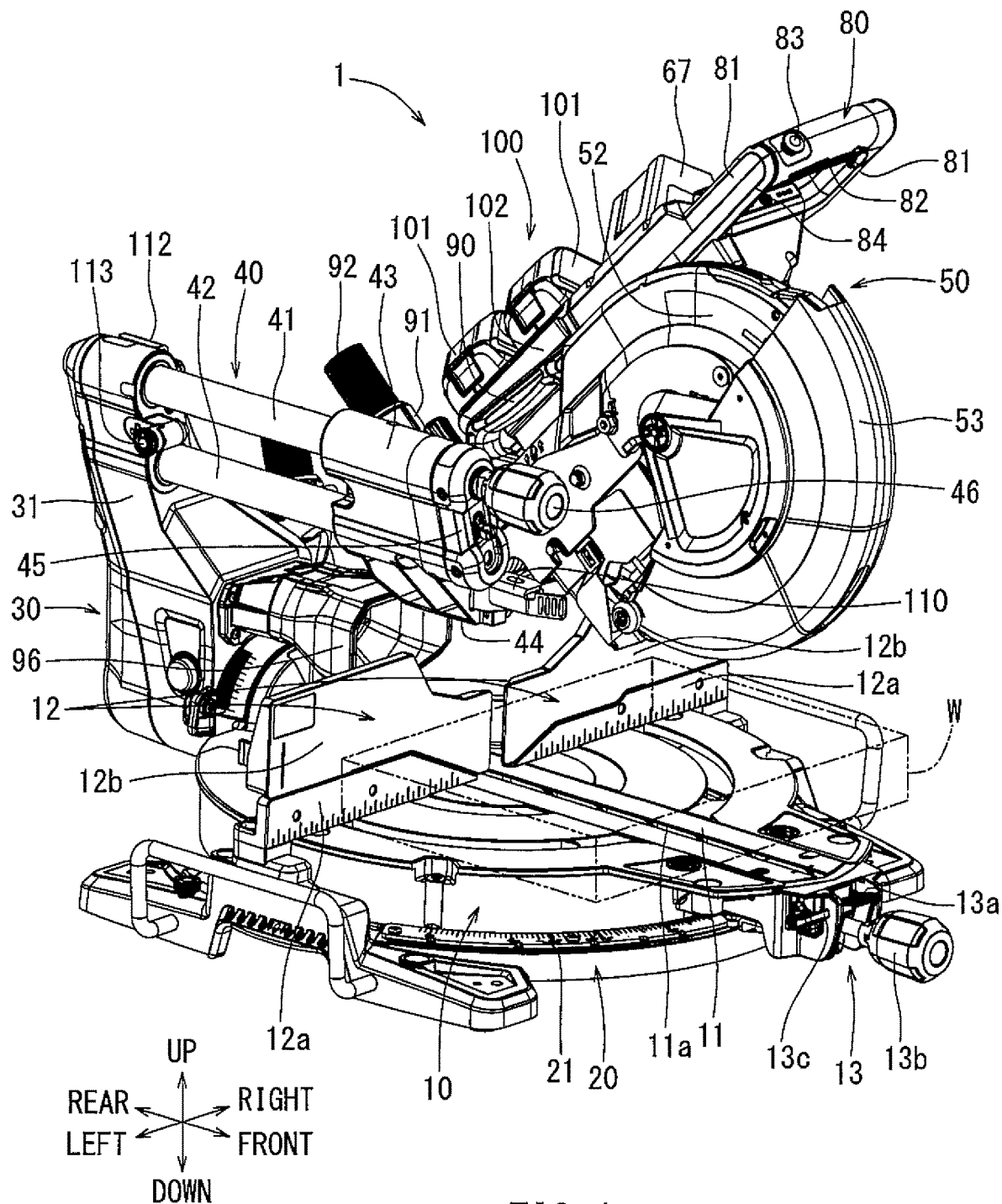
FIG. 1 is an overall perspective view of a tabletop cutting device according to a present embodiment. This figure shows a state where the cutting device is obliquely viewed from a forward-left direction. This figure shows a state where a cutting device main body is at an upper moving end position as well as at an advancing end position.
Figure 2:
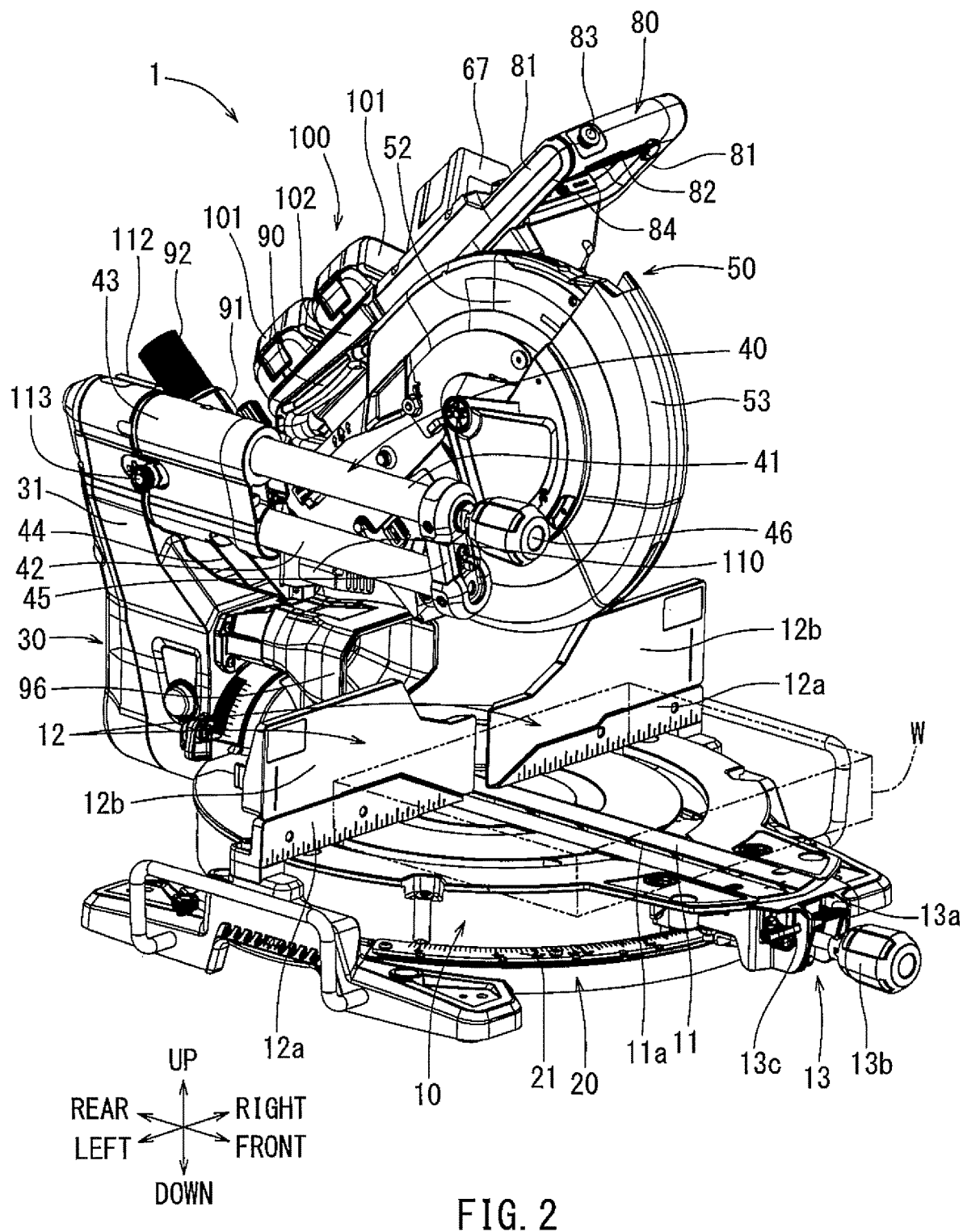
FIG. 2 is an overall perspective view of the tabletop cutting device according to the present embodiment. This figure shows a state where the cutting device main body is at the upper moving end position as well as at a retracting end position.
Figure 3:
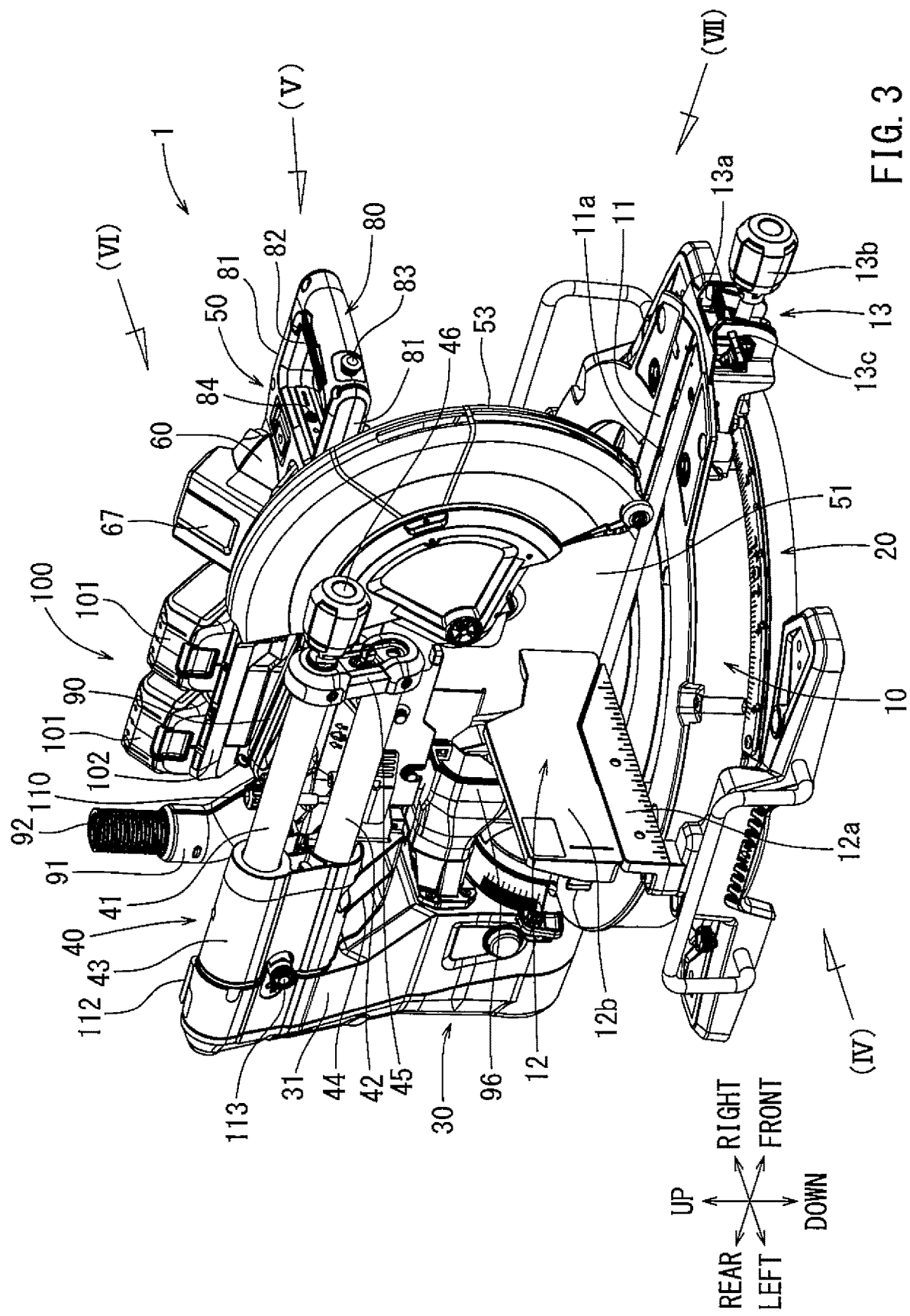
FIG. 3 is an overall perspective view of the tabletop cutting device according to the present embodiment. This figure shows a state where the cutting device main body is at a lower end position as well as at the retracting end position.

Next, embodiments according to the present invention will be explained with reference to FIGS. 1 to 16. FIGS. 1 to 3 show a tabletop cutting device 1 according to the present embodiment. Utilizing the device depicted in FIGS. 1 to 3, a user performs cutting work while positioning himself/herself on a front side of the tabletop cutting device 1. In the following explanation, the front, rear, leftward, rightward, upward, and downward directions of members and configurations may be based on the user's position. Furthermore, a near side to the user, from the user's point of view, is referred to as the front side (user side).

The tabletop cutting device 1 is often referred to as a so-called compound miter saw, which includes a table on which a material W to be cut (workpiece W) is placed, a base 20 that supports the table 10 so as to be horizontally rotatable, and a cutting device main body 50 provided with a circular cutting blade 51. The table 10 has roughly a circular shape, and a cutting edge plate 11 with a groove portion (cutting edge 11a) through which the cutting blade 51 may pass is attached on the upper surface of the table 10.

Figure 14:
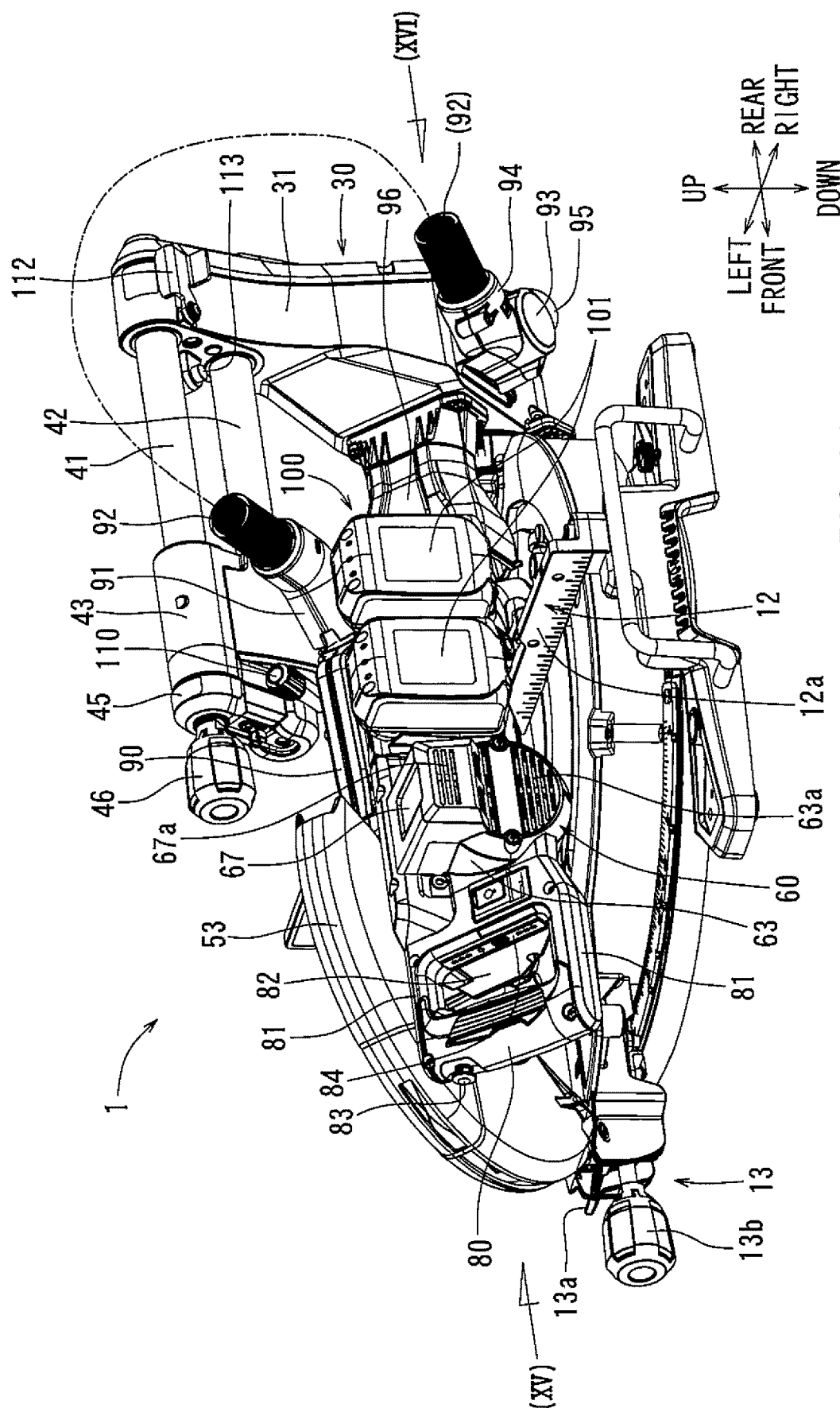
FIG. 14 is an overall perspective view of the tabletop cutting device according to the present embodiment, which is obliquely viewed from a forward-right direction. This figure shows a state where the cutting device main body is tilted in a rightward direction and the motor axis is disposed parallel to the upper surface of a table.
Figure 15:
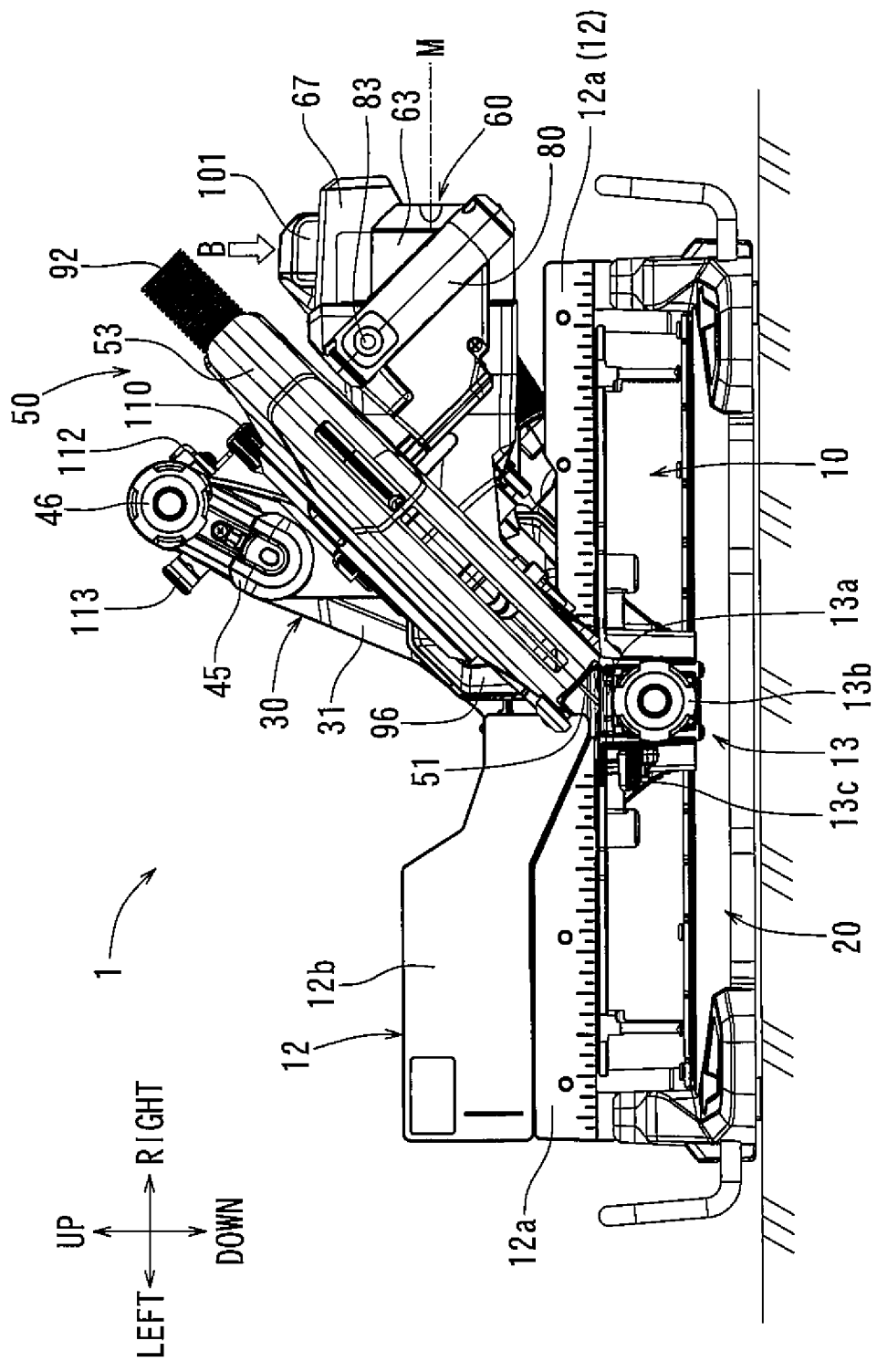
FIG. 15 is a front view of the tabletop cutting device according to the present embodiment, viewed in the direction indicated by arrow (XV) in FIG. 14.
Figure 16:
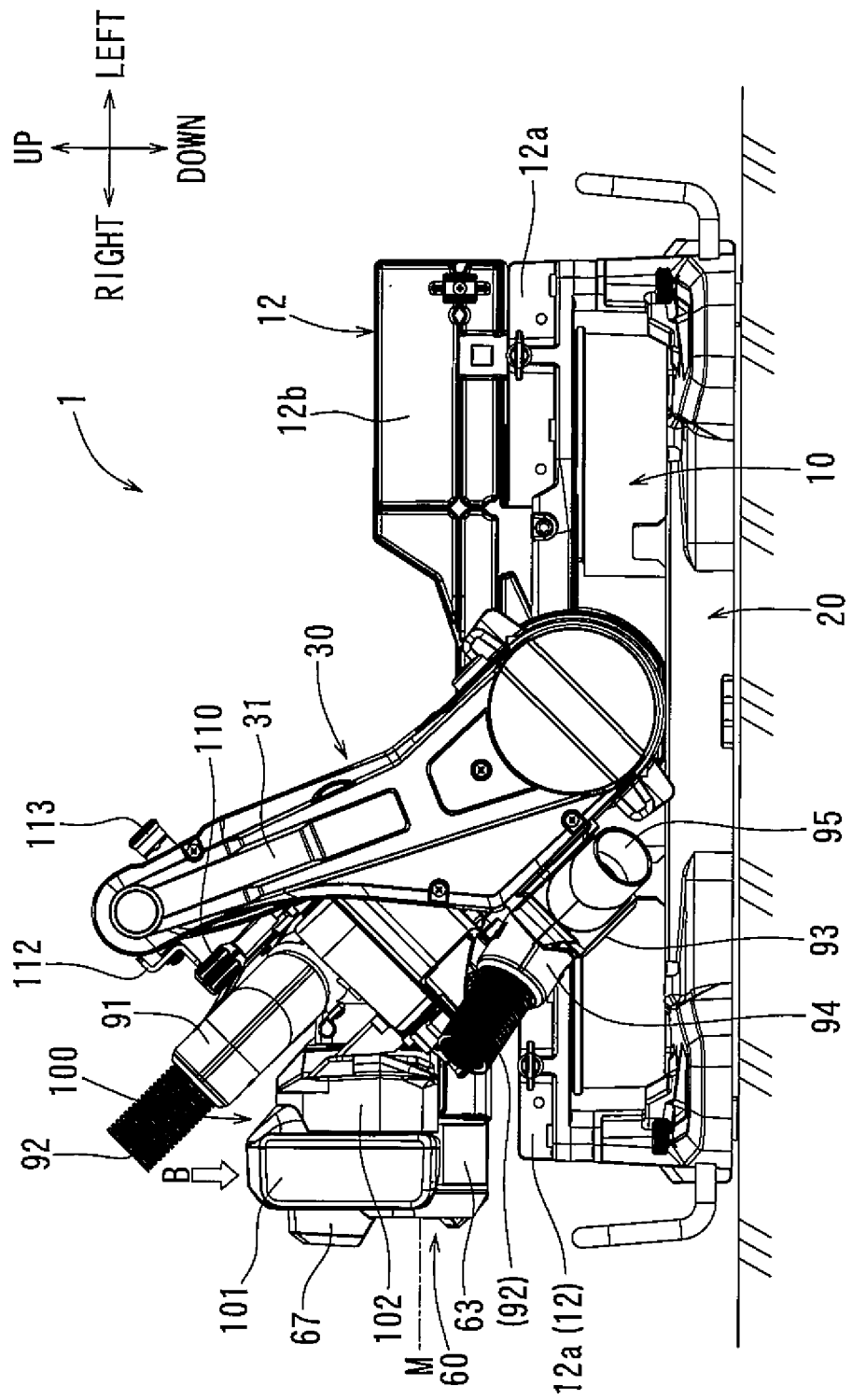
FIG. 16 is a rear view of the tabletop cutting device according to the present embodiment, viewed in the direction indicated by arrow (XVI) in FIG. 14.

Positioning fences 12 for positioning the workpiece W in the surface direction are provided on the upper surface side of the table 10. Each positioning fence 12 is arranged symmetrical to the cutting edge 11a of the cutting edge plate 11. Front surfaces (contact surface with the material) of the left and right positioning fences 12 are flush with each other. The left and right positioning fences 12 are integrally combined with each other on a rear side thereof. Each of the right and left positioning fences 12 is provided with an up/down two-stage structure having a base portion 12a on a lower stage side and a sub-fence 12b on an upper stage side. A front surface of the base portion 12a is flush with that of the sub-fence 12b. Each of the sub-fences 12b on the upper stage side can be removed from the corresponding base portion 12a. By removing the sub-fence 12a on the upper stage side, the positioning fence 12 can be lowered in height. For example, as shown in FIGS. 14 to 16, by removing the right sub-fence 12b to lower the positioning fence 12 in height, the cutting device main body 50 can be tilted by a larger angle in the rightward direction.

A rotation lock operation portion 13 for locking a rotation position of the table 10 is provided at a front part of the table 10. A rotation lock mechanism of the table 10 is provided with a first lock mechanism for locking the table 10 at predetermined rotation positions as well as a second lock mechanism for locking the table 10 at arbitrary rotation positions. An operation lever 13a for releasing a locking state of the first lock mechanism as well as an operation knob 13b for locking/unlocking the second lock mechanism is arranged in the rotation lock operation portion 13. When the operation lever 13a is pushed in the downward direction, a locking state of the first lock mechanism is released. A state where the operation lever 13a is pushed in the downward direction can be locked by rotating a lock lever 13c, which is arranged on the left side of the operation lever 13a. When the operation knob 13b of the second lock mechanism is rotated on the lock side, the table 10 can be locked at an arbitrary angle position. When the first lock mechanism and the second lock mechanism are unlocked, a rotation position of the table 10 can be adjusted in the leftward or rightward directions in the range of 0 to about 60 degrees.

A base 20 is used for placing the portable cutting device 1 on a floor surface. The table 10 is supported so as to be horizontally rotatable via a support shaft (not shown) that is provided on an upper surface center of the base 20. An angle scale 21 for numerically showing an angular position of the table 10 is provided at a front portion of the base 20. A leftward portion and a rightward portion of the base 20 protrude from a leftward portion and a rightward portion, respectively, of the table 10 in the lateral direction. The positioning fences 12 are supported by the leftward and rightward protruding portions. The positioning fences 12 are provided so as to be erected from the upper surface of the table 10 in the upward direction. The positioning surface (front surface) of the positioning fences 12 passes through a rotation center (support shaft of the base 20) of the table 10.

A cutting device main body 50 is supported at a rear portion of the table 10 via a main body supporting portion 30. The main body supporting portion 30 has mechanisms for supporting the cutting device main body 50 above the table 10 so as to be swingable in the up-to-down direction, tiltable in the left-to-right direction, and slidable in the front-to-rear direction. The workpiece W placed on the table 10 can be cut by swinging the cutting device main body 50 in the downward direction. Furthermore, cutting work can be performed in the rearward direction so as to cut the workpiece W with wide width, by sliding the cutting device main body 50 in the rearward direction while the workpiece W is being cut by the cutting blade 51.

The main body supporting portion 30 is provided with a main body supporting arm 31 extending from the rear portion of the table 10 in the upward direction. A right-angled positioning mechanism as well as an inclination positioning mechanism is housed between the lower portion of the main body supporting arm 31 and the rear portion of the table 10. The cutting blade 51 of the cutting device main body 50 can be positioned at a right angle with respect to the upper surface of the table 10 by using the right-angled positioning mechanism. The cutting blade 51 of the cutting device main body 50 can be positioned to be inclined, for example, at an angle of 45 degrees in the rightward direction or in the leftward direction by using the inclination positioning mechanism.

A front-to-rear sliding mechanism 40 is provided at the upper portion of the main body supporting arm 31. The cutting device main body 50 is supported by the main body supporting arm 31 via the front-to-rear sliding mechanism 40. Two slide bars 41 and 42 are supported in the upper portion of the main body supporting arm 31. Furthermore, the two slide bars 41 and 42 are supported so as to extend from the main body supporting arm 31 in the forward direction. The two slide bars 41 and 42 extend in parallel to each other and are spaced apart at a predetermined length in the up-to-down direction. A main body slider 43 is supported so as to be slidable in the front-to-rear direction via the two slide bars 41 and 42. A supporting base 44 is provided integrally with the lower portion of the main body slider 44. The cutting device main body 50 is supported so as to be swingable with respect to the supporting base 44 in the up-to-down direction around an up-to-down swing shaft 47.

Front end portions of the two slide bars 41 and 42 are connected to each other via a connecting member 45. An operation knob 46 of an inclination fixing mechanism for fixing a left-to-right inclination position of the cutting device main body 50 is provided in the upper portion of the connecting member 45. The inclination fixing mechanism is housed in the main body supporting arm 31. The inclination fixing mechanism can be remotely operated by using the operation knob 46. When the operation knob 46 is rotated in a fastening direction, a left-to-right inclination position of the main body supporting arm 31 is fixed such that the cutting device main body 50 is fixed at a right angle or, at an inclined angle of, for example, 45 degrees. When the operation knob 46 is loosened, the main body supporting arm 31 is allowed to be inclined in the left-to-right direction and thus a left-to-right inclination position of the cutting device main body 50 can be changed.

Figure 12:
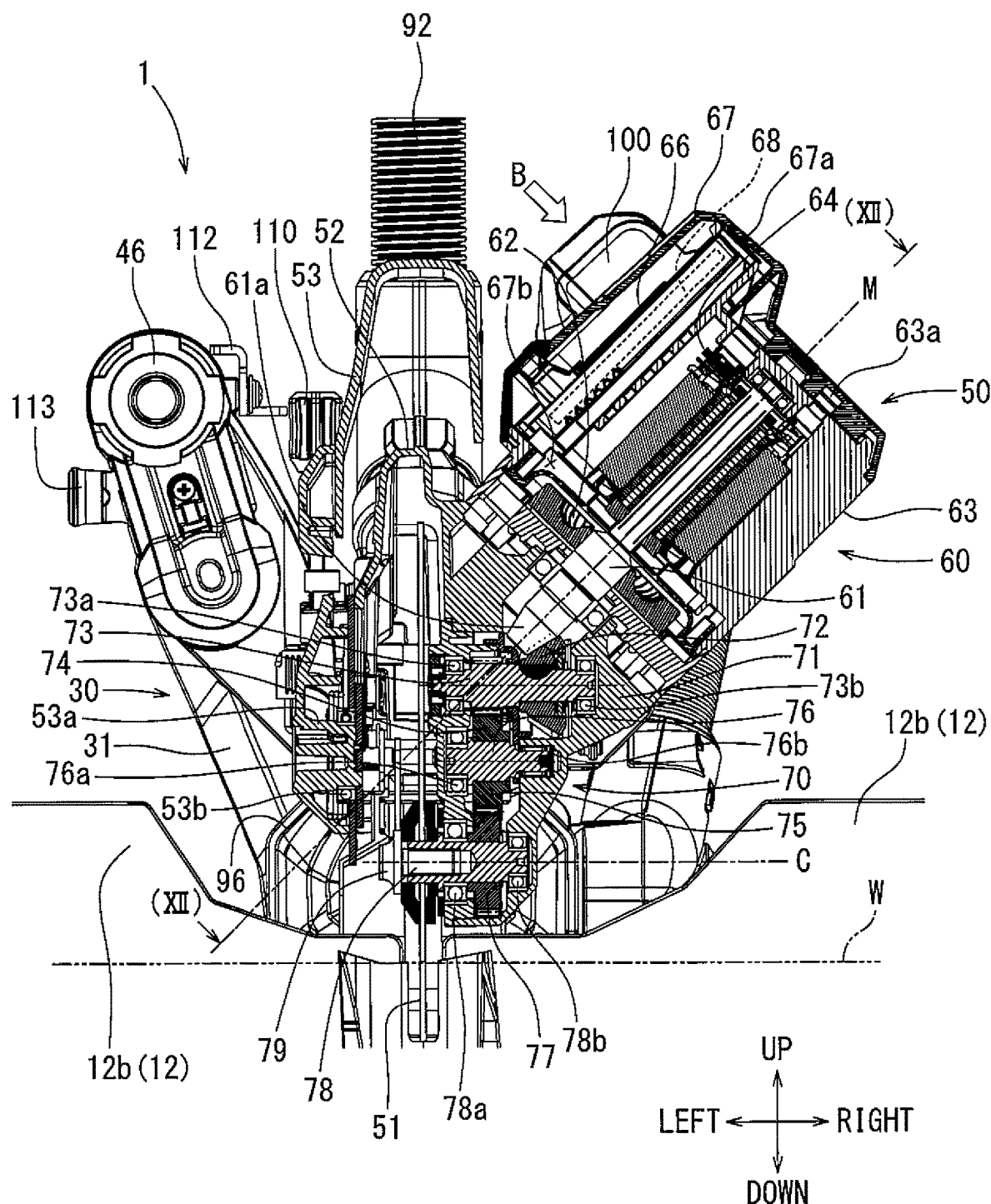
FIG. 12 is a front view of the tabletop cutting device according to the present embodiment. This figure is a cross-sectional view of a cutting device main body, taken along line (XII)-(XII) of FIG. 11.
Figure 13:
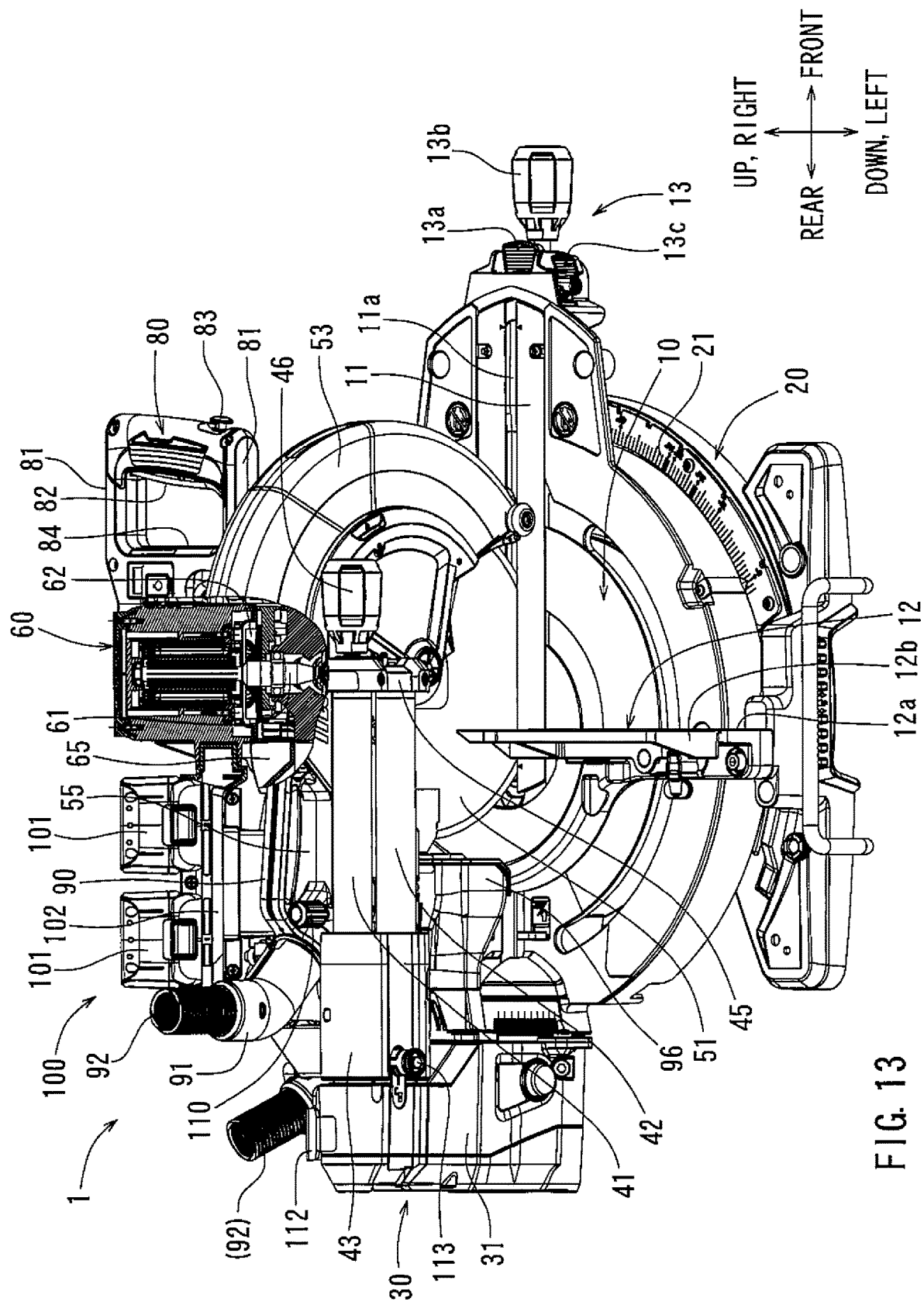
FIG. 13 is an overall perspective view of the tabletop cutting device according to the present embodiment, which is obliquely viewed from an upper-left direction as well as viewed from the direction perpendicular to the axial direction of the motor (M). In this figure, a cross section of the motor is shown.

The cutting device main body 50 is provided with an electric motor 60 as a drive source for rotating the cutting blade 51. An upper semicircular portion of the cutting blade 51 is covered by a fixing cover 52. A lower semicircular portion of the cutting blade 51 is covered by a movable cover 53. As shown in FIG. 12, the movable cover 53 is supported by a left surface side of the fixing cover 52 so as to be rotatable (so as to open/close in the up-to-down direction) via a bearing (ball bearing) 53b that is attached to the outer circumferential side of a boss portion 53a of the movable cover 53. The movable cover 53 opens and closes in accordance with the up-to-down movement of the cutting device main body 50. When the movable cover 53 opens, a lower portion of the cutting blade 51 is exposed. The exposed portion of the cutting blade 51 cuts into the workpiece W. The movable cover 53 is fully closed when the cutting device main body 50 is disposed at a top dead center (a state shown in FIGS. 1 and 2). The movable cover 53 is gradually opened as the cutting device main body 50 is moved from the top dead center in the downward direction. The movable cover 53 is fully opened when the cutting device main body 50 is moved to a bottom dead center (a state shown in FIGS. 3 to 9).

Figure 4:
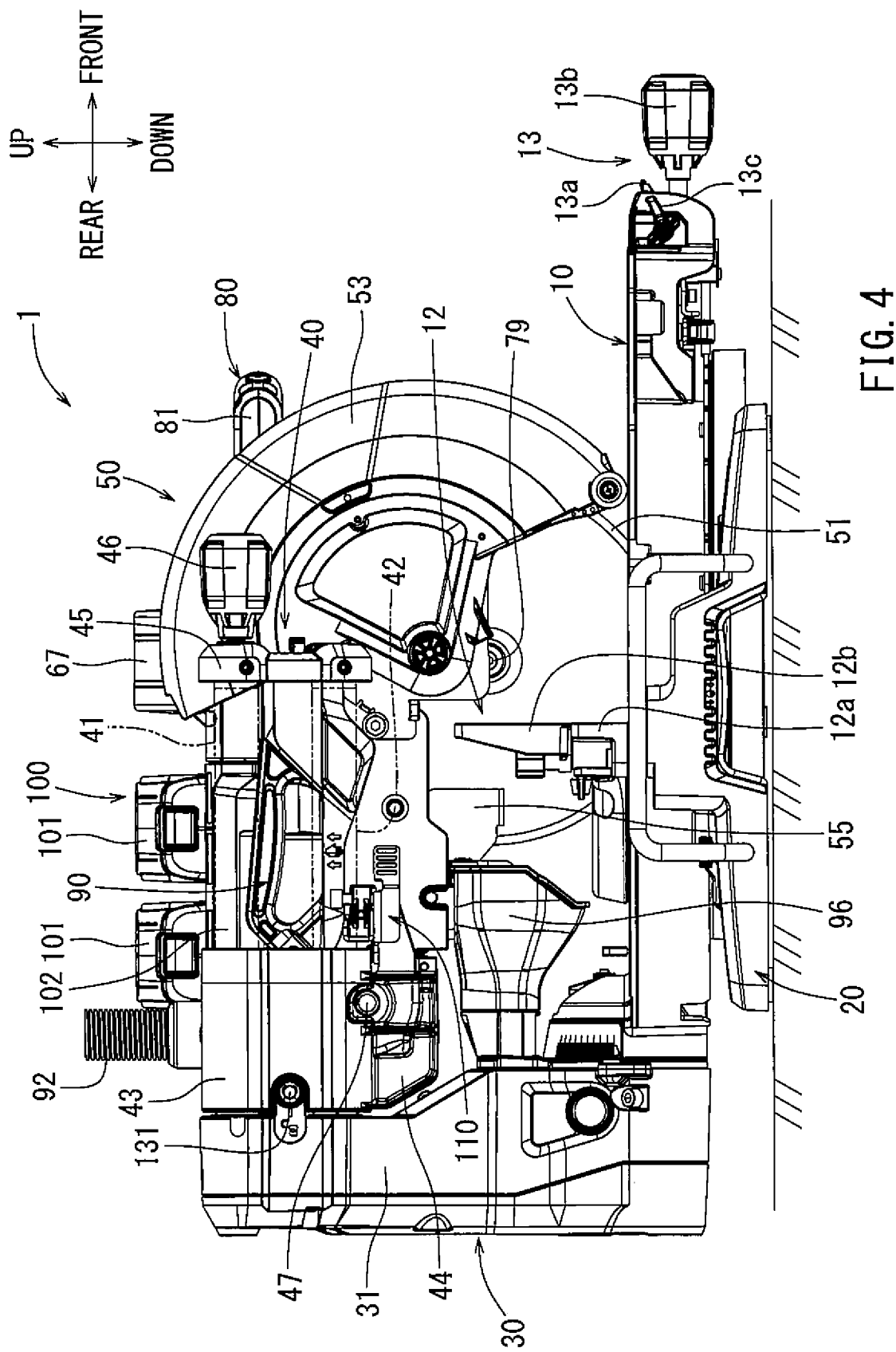
FIG. 4 is a left side view of the tabletop cutting device shown in FIG. 3, which is viewed in the direction indicated by arrow (IV) in FIG. 3.
Figure 5:
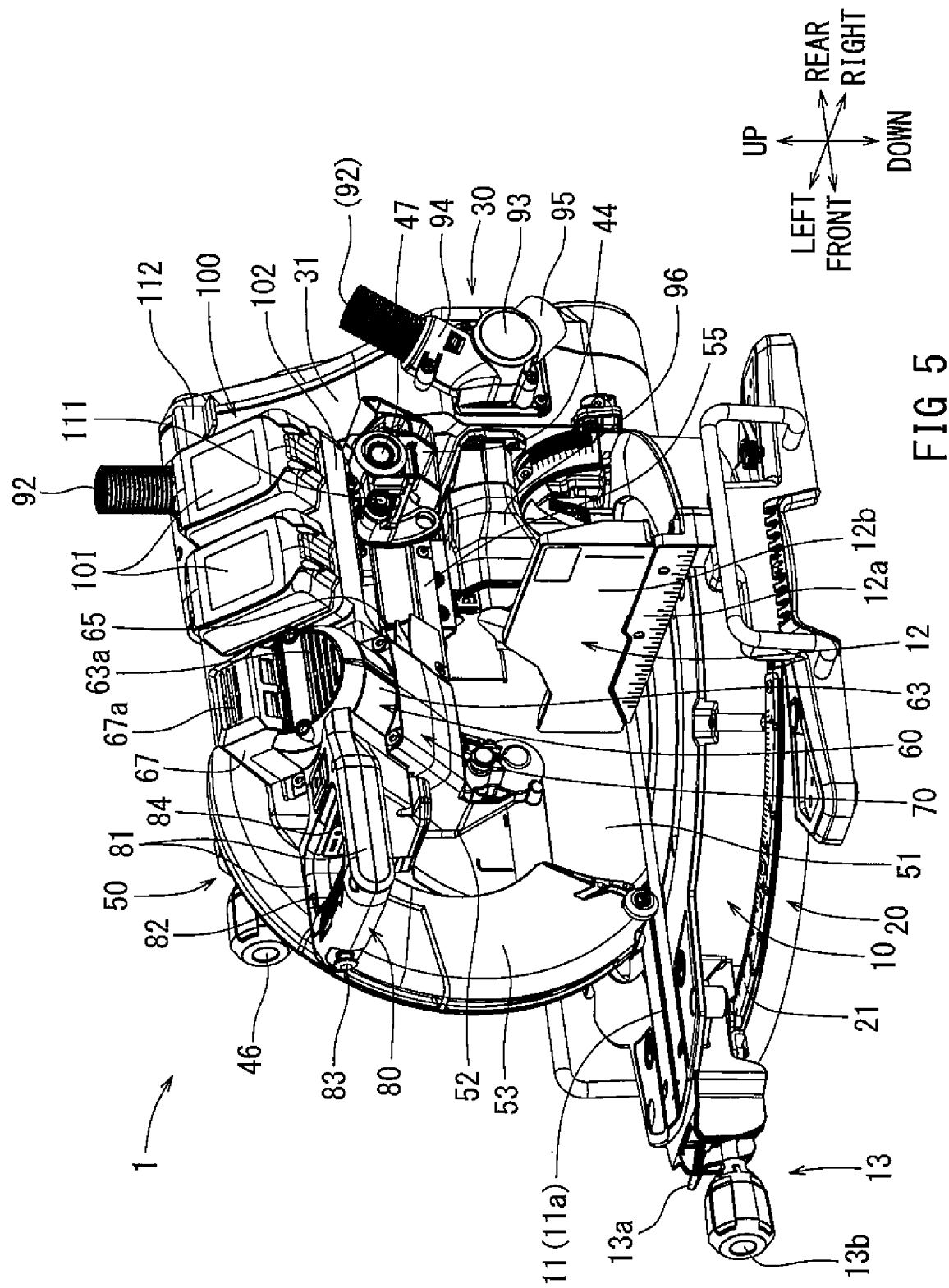
FIG. 5 is an overall perspective view of the tabletop cutting device according to the present embodiment. This figure shows a state where the cutting device is obliquely viewed from a forward-right direction, which is viewed in the direction indicated by arrow (V) in FIG. 3.
Figure 6:
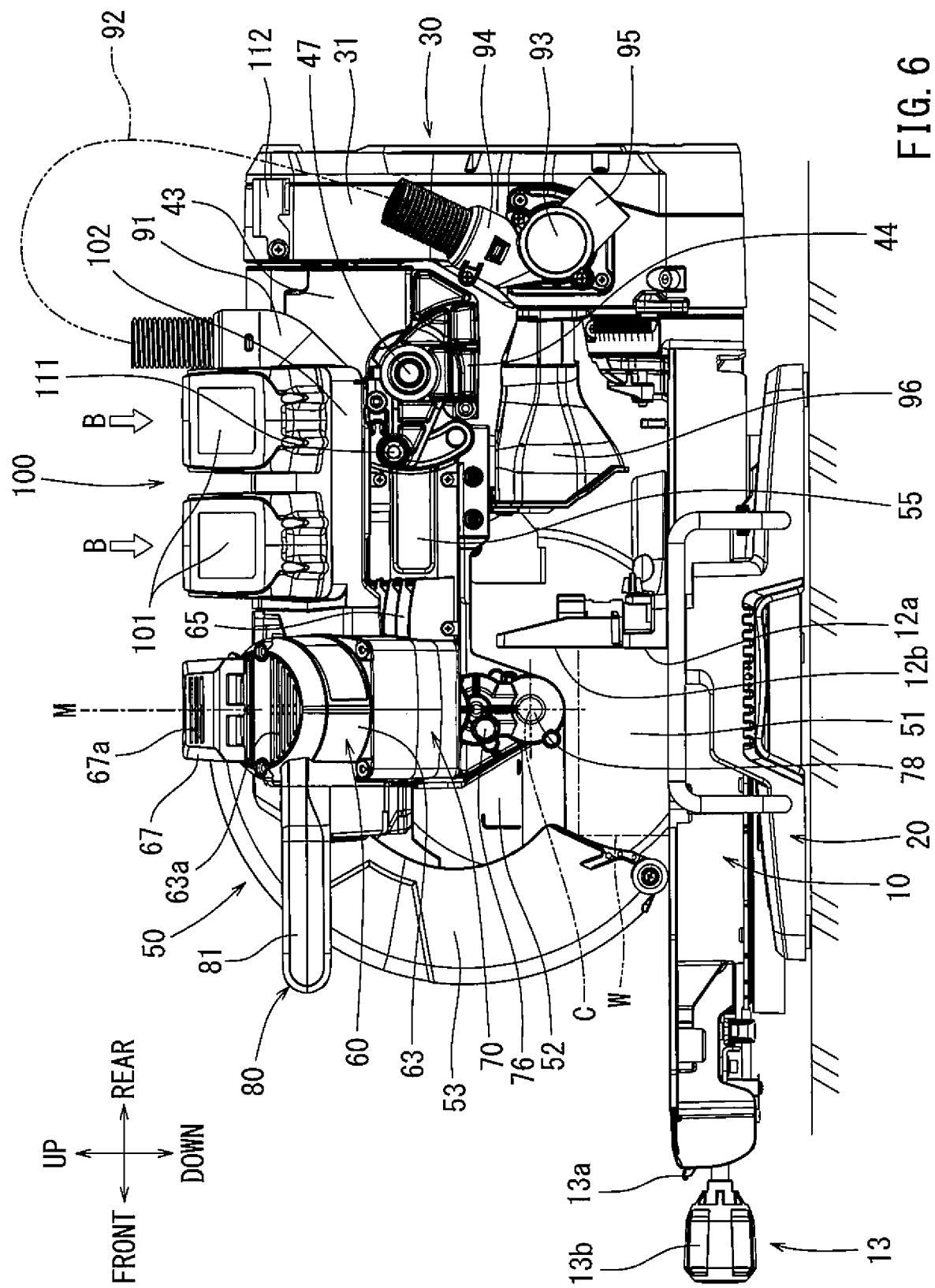
FIG. 6 is a right side view of the tabletop cutting device according to the present embodiment, which is viewed in the direction indicated by arrow (VI) in FIG. 3.
Figure 7:
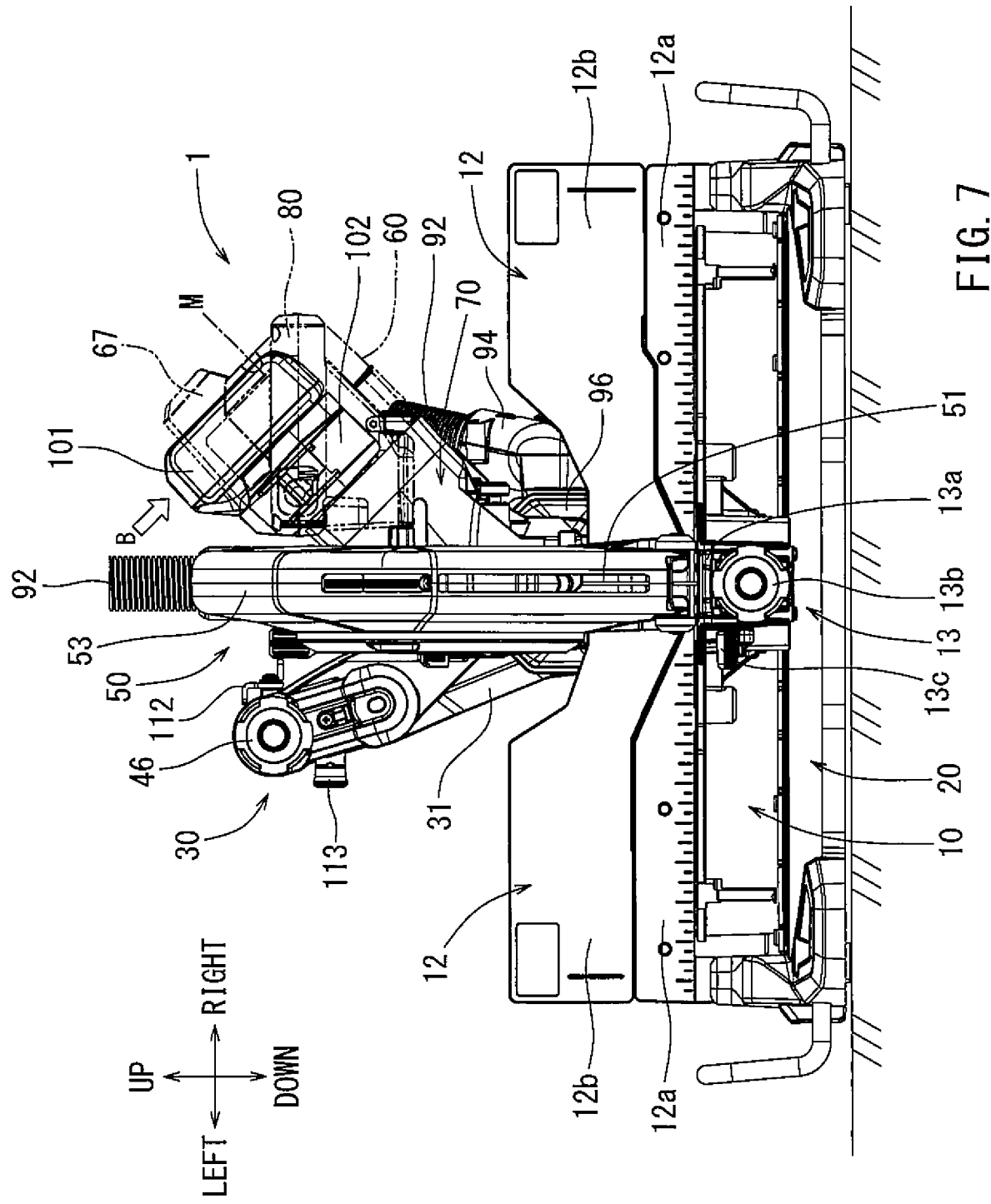
FIG. 7 is a front view of the tabletop cutting device according to the present embodiment, which is viewed in the direction indicated by arrow (VII) in FIG. 3. In this figure, a handle as well as a motor are indicated by the two-dot lines.

As shown in FIGS. 4 to 6, a supporting arm portion 55 is provided integrally with the rear portion of the fixing cover 52. The supporting arm portion 55 extends in the rearward direction. On the other hand, a supporting base portion 44 that is formed integrally with the main body slider 43 is formed in a furcated manner. The cutting device main body 50 is supported so as to be swingable in the up-to-down direction with respect to the main body slider 43. This support may be by a configuration in which the rear portion of the supporting arm portion 55 is inserted into the furcated portion of the supporting base portion 44, so as to be connected in a swingable manner in the up-to-down direction around an up-to-down swing shaft 47. The cutting device main body 50 can be swung in the up-to-down direction around the up-to-down swing shaft 47. The cutting device main body 50 is biased in an upward direction to be returned to a standby position by a torsion spring (not shown) attached around the up-to-down swing shaft 47.

The electric motor 60, which is a DC brushless motor that is operated by a DC power source, is attached to the right surface side (back side) of the fixing cover 52 via a gear head 70. A motor axis (an axis line of a motor shaft 61) M of the electric motor 60 is non-parallel to an output axis C of the cutting blade 51, but is tilted by a large extent in a direction to displace the rear side (right end side) of the electric motor 60 in the upward direction. As shown in FIGS. 14 and 15, when the cutting device main body 50 is tilted in the rightward direction at an angle of 45 degrees, the motor axis line M of the electric motor 60 aligns with a horizontal direction, which is parallel to the upper surface of the table 10. At the same time, a sliding direction B to attach a battery 101 aligns with a vertical direction, which is perpendicular to the upper surface of the table 10.

A cooling fan 62 is attached to the motor shaft 61. An inlet port 63a through which outside air is taken in is provided at a rear surface (right end surface) of a tubular-shaped motor housing 63. Outside air is introduced in the interior of the motor housing 63 by rotating the cooling fan 62. Outside air introduced into the interior of the motor housing 63 flows in the leftward direction (output side) to cool an interior of the electric motor 60, including a stator, rotor, etc.

A resin-molded, rectangular-flat-shaped controller 66, which houses a control circuit 68 for mainly controlling the electric motor 60, is housed in the upper portion of the electric motor 60. The control circuit 68 of the controller 66 includes, for example, a control circuit comprising a microprocessor that transmits control signals according to rotation position information of the rotor, which is detected by a sensor PCB 64 housed in the electric motor 60. The control circuit 68 may also include a drive circuit comprising field-effect transistors (FETs) that switch current to the electric motor 60 according to control signals received from the control circuit. The control circuit 58 may also include an auto-stop circuit that cuts power supply to the electric motor 60 according to detected results of the battery, which is discussed later, in order to prevent over-discharge, overcurrent, etc.

The controller 66 is housed in a rectangular controller housing case 67 that is attached to the upper portion of the motor housing 63. As shown in FIGS. 5, 6, 8, 11, and 14, an inlet port 67a that takes in outside air is provided on the rear surface (right end surface) of the controller housing case 67. Furthermore, the interior of the controller housing case 67 communicates with the interior of the motor housing 63 through a communicating path 67b (as shown in FIG. 12). Because of this configuration, when the electric motor 60 rotates the cooling fan 62, outside air is introduced not only into the interior of the motor housing 63 as discussed above, but also introduces air into the interior of the controller housing case 67. The interior of the controller housing case 67 as well as the control circuit can be cooled by outside air introduced through the inlet port 67a. As shown in FIG. 6, an exhaust port 65 is provided on the rear surface side of the gear head 70. Outside air (cooling air) introduced in the interior of the motor housing 63 as well as the controller housing case 67 can be discharged from the exhaust port 65 to the outside. A part of the exhaust port 65 can also be seen in FIGS. 8 and 11.

As discussed above, the electric motor 60 is attached in such a manner that the motor axis M on the rear side is tilted in the upward direction with respect to the output axis C of the cutting blade 51. Because of this configuration, as shown in FIG. 12, when the cutting device main body 50 is disposed at a right-angled cutting position, i.e. in such a manner that the cutting blade 51 is perpendicular to the upper surface of the table 10, the motor axis M of the electric motor 60 is non-parallel to the upper surface of the table 10. Instead, the motor axis M is tilted in a direction to position the rear side of the electric motor 60 in the upward direction. In so arranging the electric motor 60, the cutting device main body 50 is allowed to be tilted in the rightward direction by a larger extent.

The electric motor 60 is attached on the right side of the fixing cover 52 via the gear head 70. The gear head 70 is configured to include a gear housing 71 in which a two stage reduction gear train is housed. The gear housing 71 is formed integrally with the fixing cover 52 on the right surface side thereof. An output gear portion 61a is provided at the tip end of the motor shaft 61 of the electric motor 60. The output gear portion 61a is engaged with a first driven gear 72. The first driven gear 72 is fixed on a first driven shaft 73. On the left side of the first driven gear 72, a second driven gear 74 is fixed on the first driven shaft 73. The first driven shaft 73 is rotatably supported by the gear housing 71 via bearings 73a and 73b.

The second driven gear is engaged with a third driven gear 75. The third driven gear 75 is fixed on the second driven shaft 76. The second driven shaft 76 is rotatably supported by the gear housing 71 via bearings 76a and 76b. The second driven shaft 76 is arranged parallel to the first driven shaft 73. The third driven gear 75 is engaged with a fourth driven gear 77. The fourth driven gear 77 is fixed on a spindle 78. The spindle 78 is rotatably supported by the lower portion of the gear housing 71 via bearings 78a and 78b. The spindle 78 is arranged parallel to the first driven shaft 73 and the second driven shaft 76. As shown in FIG. 6, the axis of the second driven shaft 76 is arranged to be offset with regard to the axis of the first driven shaft 73 (or motor axis M) and the axis of the spindle 78 (output axis C). Because of this configuration, the gear head 70 can be made compact in the up-to-down direction, while a necessary reduction ratio (gear diameter) is obtained.

As shown in FIG. 12, the spindle 78 protrudes towards the interior of the fixing cover 52. The cutting blade 51 is attached to the protruding portion. The center portion of the cutting blade 51 is held by an outer flange and an inner flange, and the cutting blade 51 is attached to the spindle 78 by fastening a cutting blade fixation screw 79.

As shown in FIGS. 1 to 3, a handle 80 that is configured for a user to hold is provided on a front lateral side of the electric motor 60, when viewed from the user. The handle 80 is arranged approximately parallel to the rotation axis of the cutting blade 51 (output axis C of the spindle 78), and the user holds the handle in a horizontal direction. The left and right portion of the handle 80 are connected to the front lateral portion of the electric motor 60 via legs 81. A switch lever 82 is arranged on a rear surface of the handle 80. When the user holds the handle 80 and pulls the switch lever 82 towards the near side to the user, the electric motor 60 runs to rotate the cutting blade 51. A lock-off switch 83 is provided on the front surface of the handle 80. The user can pull (on-operate) the switch lever 82 while pushing the lock-off switch 83. A display portion 84 for displaying a residual capacity of the battery, which is discussed later, is provided on an opposite portion of the handle 80.

As shown in FIGS. 1 to 4, a carrying handle 90 for carrying the cutting device 1 is provided behind the fixing cover 52 and above the supporting arm portion 55. The carrying handle 90 extends in a direction in which the supporting arm portion 55 extends. The carrying handle 90 is provided to straddle the upper rear surface of the fixing cover 52 as well as the rear portion of the supporting arm portion 55. The carrying handle 90 extends approximately in the horizontal direction when the cutting device main body 50 is disposed approximately at the lower moving end position. The user operates the cutting device main body 50 to be locked at the lower moving end position and holds the carrying handle 90 to carry the tabletop cutting device 1. In this way, the user can carry the tabletop cutting device 1 in a well-balanced manner without the cutting device 1 being tilted in the front-to-rear and left-to-right direction.

Figure 8:
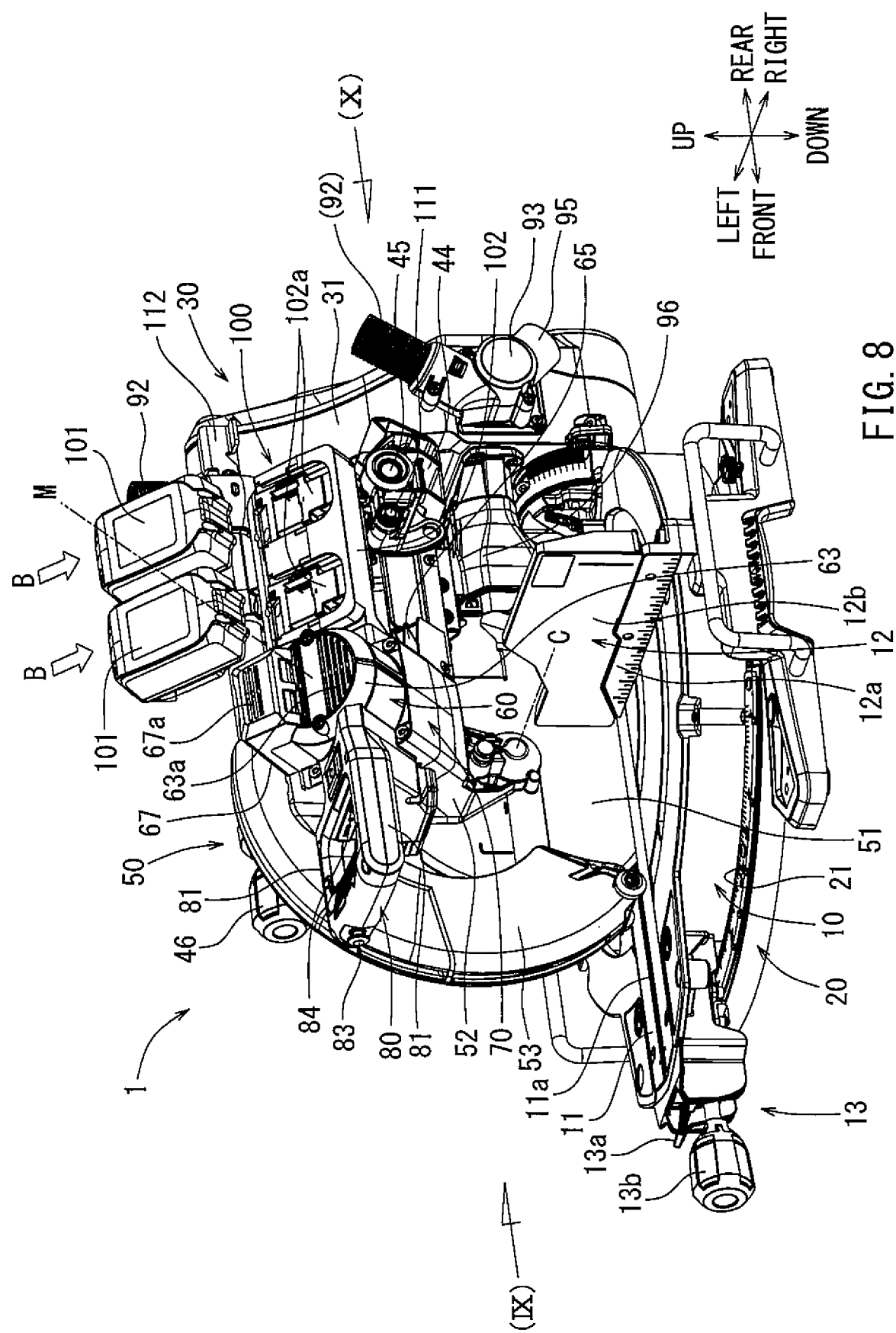
FIG. 8 is a perspective view of the tabletop cutting device according to the present embodiment, which is obliquely viewed from a forward-right direction. This figure shows a state where two batteries being attached.

A battery attachment portion 100 is provided behind the electric motor 60 as well as on the right side of the cutting blade 51. As shown in FIG. 8, the battery attachment portion 100 includes an attachment base 102 for attaching two batteries 101. Connection portions 102a for attaching the two batteries side by side in the front-to-rear direction are provided on the upper surface of the attachment base 102. A positive and negative power terminals for electrically connecting the battery 101 and a pair of rails for mechanically connecting the battery 101 are arranged in each of the left and right connection portions 102a.

The battery 101 attached to the battery attachment portion 100 is a sliding-attachment type battery and comprises a plurality of lithium-ion battery cells that are housed in a rectangular-box-shaped case. By attaching two batteries 101, each nominal voltage being 18V, a voltage of 36V can be supplied to the cutting device 1. A versatile battery pack, which is also used as a power source for other electric power tools such as, for example, a rechargeable screw fastening tool, can be used as the battery 101.

Figure 9:
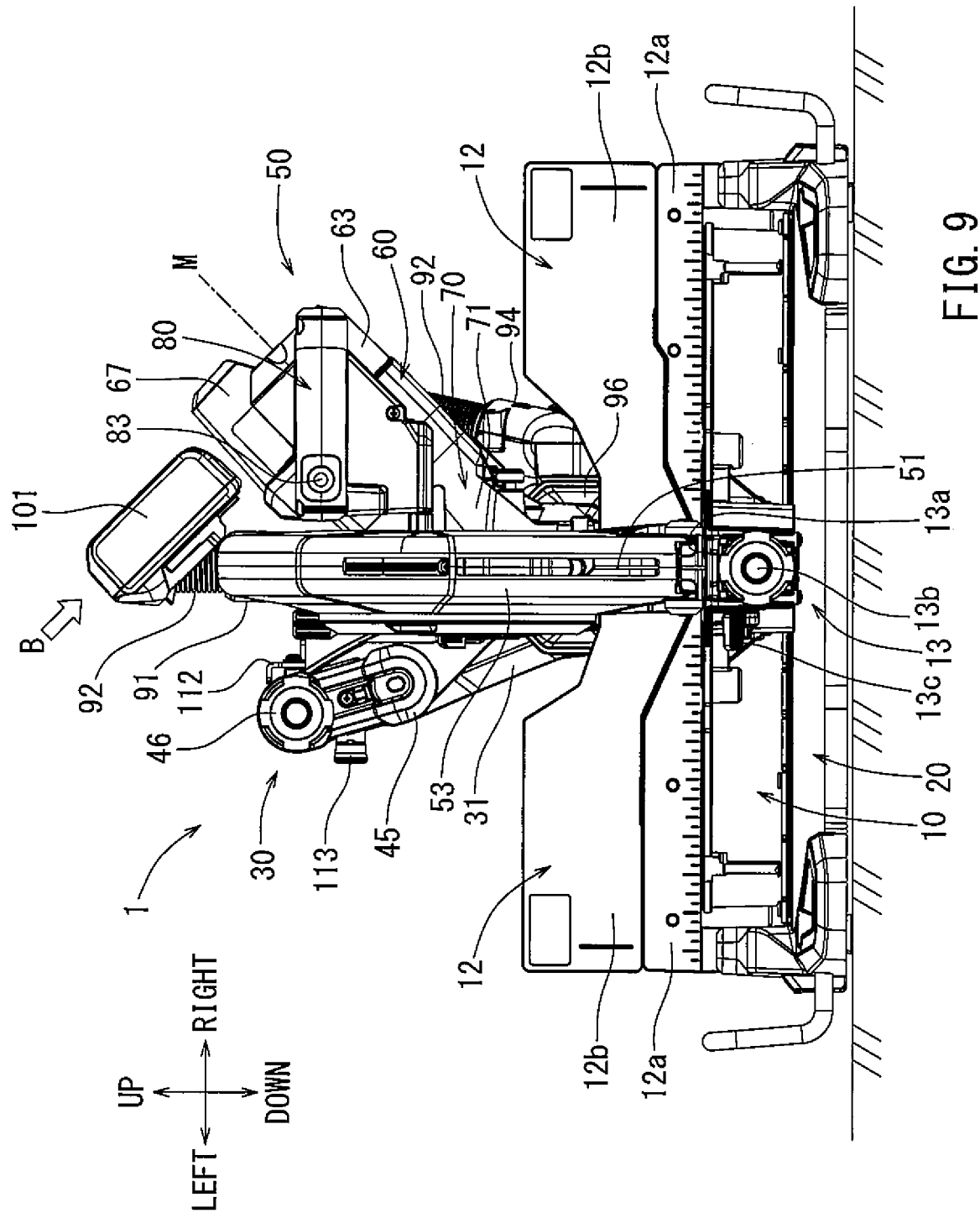
FIG. 9 is a front view of the tabletop cutting device according to the present embodiment, viewed in the direction indicated by arrow (IX) in FIG. 8.
Figure 10:
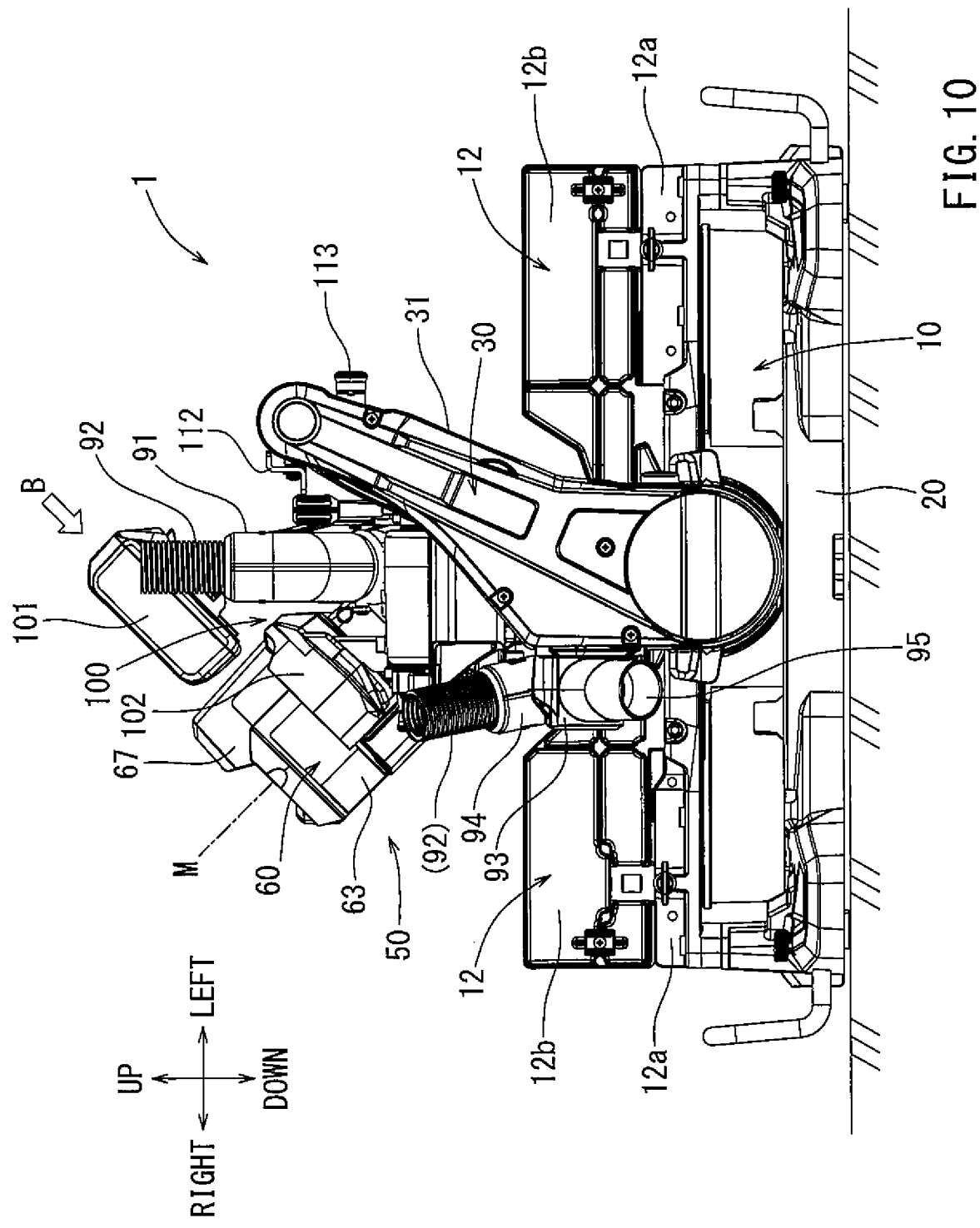
FIG. 10 is a rear view of the tabletop cutting device according to the present embodiment, viewed in the direction indicated by arrow (X) in FIG. 8.

As shown in FIGS. 8 to 10, an attachment direction (sliding direction B) of the battery 101 with respect to the connection portions 102a of the attachment base 102 is non-parallel to the surface direction of the cutting blade 51 (the generally up-to-down swing direction of the cutting device main body 50), but is instead tilted obliquely in the downward direction and to the right. Furthermore, the sliding direction B for attaching the battery 101 is approximately perpendicular to the motor axis M of the electric motor 60. Because of this configuration, a thickness direction of the battery 101 (a direction perpendicular to the connection portions 102a) is approximately parallel to the motor axis M. Other than a configuration in which the thickness direction is parallel to the motor axis M, an alternative attachment direction of the battery 101 may be such that a thickness direction of the battery 101 is set to a more vertical direction, and the battery 101 may be attached by sliding the battery 101 approximately in a more horizontal direction. In FIGS. 8 to 10, the batteries 101 are shown apart from the attachment base 102 for convenience of explanation, but it is needless to say that in fact the user holds the battery 101 one by one in the designated position before attaching the battery 101.

The sliding direction B for attaching the battery 101 is non-parallel to the downward direction in which the cutting device main body 50 moves, but angled with respect to said direction. Because of this configuration, part of the attaching operation force (the pushing-down force obliquely applied in the right-downward direction) of the battery 101 with respect to the connection portions 102a may not be applied in the downward direction in which the cutting device main body 50 moves. Because all of the attaching operation force of the battery 101 is not applied to the downward direction in which the cutting device main body 50 moves, the cutting device main body 50 may not be easily moved in the downward direction when the battery 101 is attached. Furthermore, a detaching direction of the battery 101 from the connection portions 102a is tilted obliquely in the upward direction to the left. Because of this configuration, a part of the detaching operation force (pulling-up force obliquely applied in the upward direction to the left) of the battery 101 may not be applied to the upward direction in which the cutting device main body 50 moves. Thus, the position of the cutting device main body 50 in the up-to-down direction can be retained and a stable installation state of the tabletop cutting device 1 can be easily maintained.

Furthermore, because the sliding direction B for attaching the batteries 101 is configured to be obliquely tilted in the downward direction to the right, the batteries 101 can be attached above the carrying handle 90 and the batteries 101 on the side of the cutting blade 51 are in a high position. Because of this configuration, the batteries 101 can be attached to and detached from the connection portions 102a, while avoiding interference with the carrying handle 90, etc.

Furthermore, the sliding direction B for attaching the batteries 101 is configured to be misaligned with respect to the motor axis M. Because of this configuration, as shown in FIGS. 9 and 10, the attachment direction (sliding direction) B of the batteries 101 is positioned approximately perpendicular to the motor axis M when viewed from the frontward direction, as well as from the rearward direction. Furthermore, as shown in FIGS. 6 and 11, the sliding direction B for attaching the batteries 101 is configured to be parallel to the motor axis M, when viewed from the leftward or rightward directions.

Figure 11:
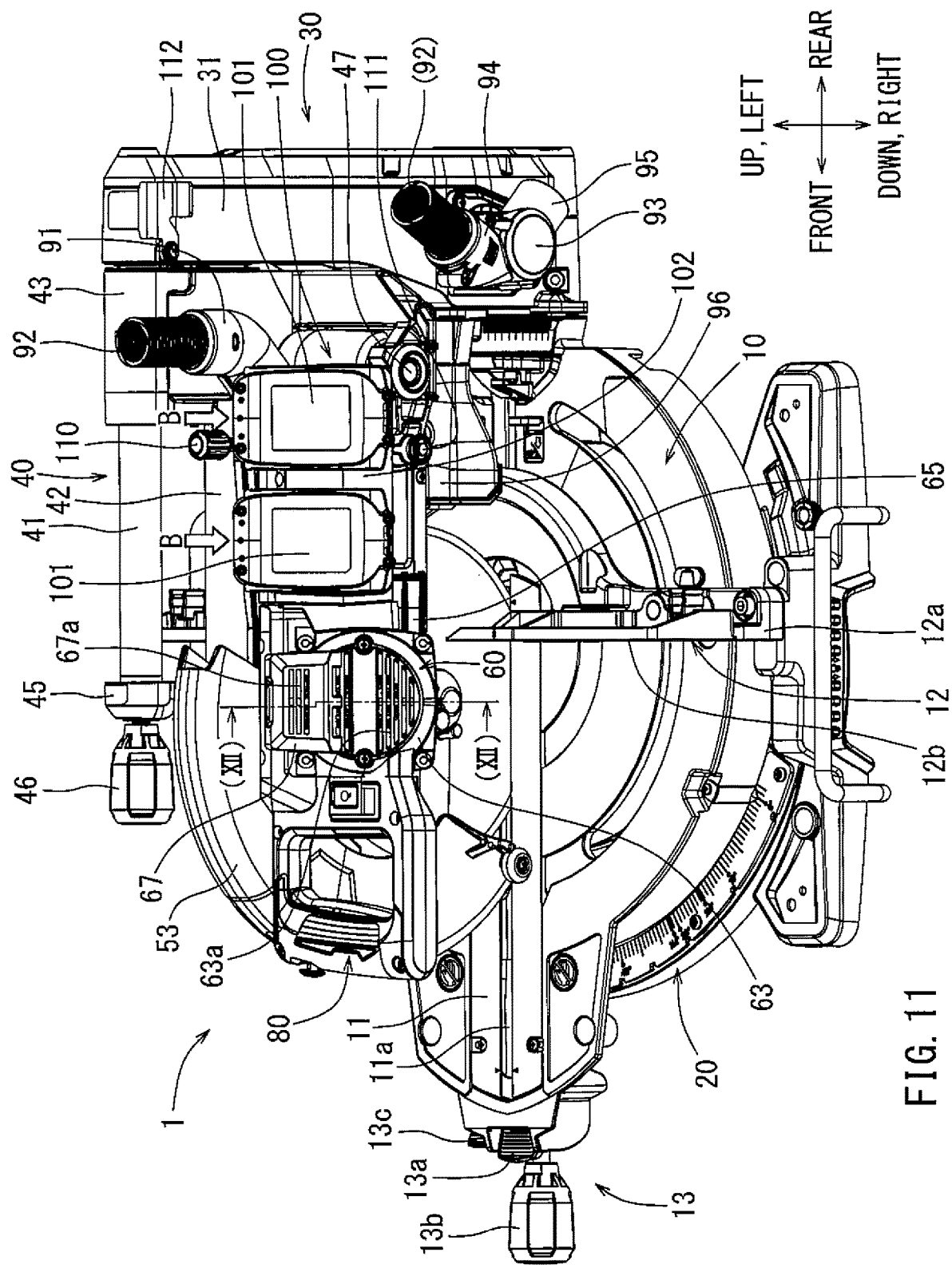
FIG. 11 is a perspective view of the tabletop cutting device according to the present embodiment, which is obliquely viewed from an upper-right direction as well as viewed from the axial direction of a motor (M).

Furthermore, the attachment base 102 of the batteries 101 is disposed behind the electric motor 60, as shown in FIG. 11, such that the attached batteries 101 are partially disposed above the electric motor 60 and do not protrude below the electric motor 60. Because of this configuration, when the cutting device main body 50 is tilted in the rightward direction, the batteries 101 may be prevented from interfering with the workpiece W or the positioning fence 12. Thus, the cutting device main body 50 can be tilted in the rightward direction to a larger extent.

As shown in FIGS. 6 and 14, a main body side connection port 91 for connecting a dust collection hose 92 is provided at the rear portion of the supporting arm portion 55 as well as behind the carrying handle 90. Cutting dust blown to the interior of the fixing cover 52 can be collected through the dust collection hose 92. The dust collecting hose 92 that is connected to the main body side connection port 91 is connected to an intermediate connection port 94 of a relay duct 93 that is disposed on the right side of the main body supporting portion 30. A bellows-shaped flexible hose having adequate expandability and flexibility is used for the dust collection hose 92. The dust collecting hose 92 is connected to the main body side connection port 91 as well as to the relay duct 93 via an arrangement path such that the dust collection hose 92 is largely bent between the main body side connection port 91 and the relay duct 92 in the upward direction, as shown in the figures. A length of the dust collection hose 92 between the main body side connection port 91 and the relay duct 93 (a total length of the dust collection hose 92 in the present embodiment) is configured such that the cutting device main body 100 can be moved over an entire swing range along the up-to-down direction and an entire slide range in the front-to-rear direction. Each end of the dust collection hose 92 is rotatably connected to the main body side connection port 91 and the intermediate connection port 94, respectively, around its rotation axis. Because of this configuration, the dust collection hose 92 rotates around each rotation axis according to a movement of the cutting device main body 92 in the up-to-down, front-to-rear, and left-to-right directions, preventing the dust collection hose 92 to be crushed, which might be caused by unnatural bending or torsion. As a result, an adequate collection path of the dust collection hose 92 can be obtained.

A large-sized dust collection duct 96 is attached on the rear side of the table 10 as well as in front of the main body supporting arm 31. The dust collection duct 96 opens in the forward direction from behind the positioning fence 12. Cutting dust blown upward in the rearward direction from the positioning fence 12 by rotation of the cutting blade 51 is collected by the dust collection duct 96. The dust collection duct 96 is in communication with the relay duct 93. Because of this configuration, cutting dust collected by the dust collection duct 96 may be collected by the relay duct 93, as well as cutting dust blown towards the interior of the fixing cover 52. The relay duct 93 is provided with an exhaust port 95 that can be swung in the up-to-down direction. A hose that is separately provided can be connected to the exhaust port 95.

The portable cutting device 1 of the present embodiment includes a lower limit position change mechanism 110, a swing lock mechanism 111, a slide intermediate stopper 112, and a slide rear end position lock mechanism 113. A brief explanation of each of these mechanisms follows. The lower limit position change mechanism 110 is provided for changing the lower moving end position of the cutting device main body 50 in the up-to-down swing range of the cutting device main body 50. The lower limit position change mechanism 110 has a function of adjusting or changing a cutting depth of the cutting blade 51 into the workpiece W. A part of the lower limit position change mechanism 110 can be seen in FIGS. 1 to 4. The lower limit position change mechanism 110 is provided between the supporting arm portion 55 of the cutting device main body 50 and the supporting base portion 44 of the main body slider 43. Two stopper screws (not shown) are provided in the supporting arm portion 55. A select lever for selecting an enable/disable state of the two stopper screws, each fastening length of which differs from each other, is provided in the supporting base portion 44. The lower moving end position of the cutting device main body 50 can be changed by selecting the position of the select lever for either of the two screws. By selecting the lower moving end position of the cutting device main body 50 in a rapid manner, repeatability of, for example, performing groove cutting with a predetermined cutting depth can be improved.

The lower moving end position of the cutting device main body 50 can be restricted by the swing lock mechanism 111 as well as by the lower limit position change mechanism 110. The cutting device main body 50, which has been swung in the downward direction as shown in FIGS. 3 to 6, can be locked at a lock position by the swing lock mechanism 111. As shown in FIGS. 5 and 6, the swing lock mechanism 111 is provided in the supporting base 44 of the main body slider 43. The swing lock mechanism 111 includes a configuration in which the cutting device main body 50 is locked at the lock position in the downward direction by engaging a lock pin with a lock hole provided in the supporting arm portion 55 of the cutting device main body 50. As described earlier, when the cutting device main body 50 is locked in the lock position by using the swing lock mechanism 111, the carrying handle 90 is positioned approximately in the horizontal direction, and thus the tabletop cutting device 1 can be carried in a well-balanced manner. When the lock pin is extracted from the lock hole, the locked state of the cutting device main body 50 at the lock position is released and the cutting device main body 50 is returned to the standby position in the upward direction.

As shown in FIGS. 6, 11, and 14, the slide intermediate stopper 112 is provided on an upper right side of the main body supporting portion 30. The slide intermediate stopper 112 is provided so as to be pivotable in the up-to-down direction. When the slide intermediate stopper 112 is pivoted in the forward direction, the slide intermediate stopper 112 protrudes in a lateral direction of the upper slide bar 41. Because of this configuration, when the cutting device main body 50 is slid in the rearward direction, the rear end surface of the main body slider 43 contacts the slide intermediate stopper 112, which restricts further sliding movement in the rearward direction. When the slide intermediate stopper 112 is pivoted in the rearward direction as shown in the figures, the main body slider 43 can be slid (along an entire slide range) to a position where the rear end surface of the main body slider 43 contacts the front surface of the main body supporting arm 31. A rear end position of the main body slider 43 can be moved forward by the length of the slide intermediate stopper 112 by moving the slide intermediate stopper 112 to the front-side stopper position. By restricting movement of the rear end of the main body slider 43 using the slide intermediate stopper 112, cutting work can be performed without damaging a workpiece W such as, for example, a crown-shaped molding material.

A position of the cutting device main body 50 can be locked at the rear end position (slide rear end position) by using the slide rear end position lock mechanism 113. The slide rear end position lock mechanism 113 is provided on the upper left side of the main body supporting portion 30. The slide rear end position lock mechanism 113 is provided with a lock pin that is similar to the lock pin in the above-discussed swing lock mechanism 111. A lock hole into which the lock pin is inserted is provided at the rear portion of the main body slider 43. When the cutting device main body 50, which is, for example, locked at the lock position by the above-discussed swing lock mechanism 111, is slid to a retracting end position and the lock pin is inserted into the lock hole, the position of the main body slider 43 as well as the cutting device main body 50 is locked at the retracting end position. When the lock pin is extracted from the lock hole, the main body slider 43 as well as the cutting device main body 50 can be slid in the front-to-rear direction.

According to the tabletop cutting device 1 of the present embodiment as discussed above, the sliding direction B for attaching the batteries 101 is obliquely tilted in the downward direction to the right so as to be angled with respect to the cutting blade 51. In other words, the sliding direction B is non-parallel to the downward direction in which the cutting device main body 50 moves, but is instead angled with respect to said direction. Because of this configuration, a part of the operation force in the right-downward direction that the user applies when the batteries 101 are attached to the connection portion 102a of the attachment base 102 is not applied to the downward direction in which the cutting device main body 50 moves. Thus, in comparison with a case where the attachment direction is parallel to the downward direction in which the cutting device main body 50 moves, the cutting device main body 50 of the present embodiment is not easily moved in the downward direction. In this way, the batteries 101 may be obliquely slid in the downward direction to the right in such a manner that the cutting device main body 50 is not easily moved in the downward direction. As a result, the batteries 101 can be easily attached to the cutting device 1.

Furthermore, when the batteries 101 are detached, a part of the operation force that is applied in a direction opposite to the sliding direction B for attaching the batteries 101 (obliquely upward to the left), is not applied to the direction in which the cutting device main body 50 moves in the upward direction. As a result, the batteries 101 can be slid obliquely in the upward direction to the left in order to be removed from the connection portion 102*a* of the attachment base 102 in such a manner that the up-to-down position of the cutting device main body 50 is easily retained.

Furthermore, the batteries 101 are attached on a drive section side with respect to the cutting blade 51 (on the right side of the fixing cover 52), and the sliding direction B for attaching the batteries 101 is tilted in the downward direction from the cutting blade 51 side to the drive section side. Because of this configuration, a space on an opposite side to the drive section side (anti-drive section side) with respect to the cutting blade 51 can be obtained. Furthermore, an upper portion of the batteries 101, which is disposed on the side of the cutting blade 51, can be disposed at a higher position. Because of this configuration, interference of the batteries 101 with regard to, for example, the carrying handle 90, the main body side connection port 91, and/or the dust collection hose 92 is avoided.

Furthermore, according to the present embodiment, the sliding direction B for attaching the batteries 101 is configured to be misaligned with regard to the motor axis M. Furthermore, when the cutting device main body 50 is tilted to the right side as shown in FIGS. 14 to 16, the batteries 101 are positioned partially above the motor housing 63 of the electric motor 60. Because of this configuration, the cutting device main body 50 can be tilted by a larger angle for cutting a workpiece W without the batteries 101 interfering with the workpiece W or the positioning fence 12 (base portion 12*a*).

Furthermore, the motor axis M of the electric motor 60 is tilted with respect to the output axis C of the cutting blade 51. Also, the motor axis M of the electric motor 60 may be parallel to the thickness direction of the batteries 101, or disposed within an angle range between the parallel direction and a direction closer to a vertical direction. In this configuration, the cutting device main body 50 can be tilted by a larger angle for cutting a workpiece W without the batteries 101 interfering with the workpiece W or the positioning fence 12 (base portion 12*a*).

Furthermore, in the exemplified tabletop cutting device 1, because the two batteries 101 are attached side by side in the front-to-rear direction, a large power source can be used. Additionally, a large space is not necessary in the left-to-right direction for accommodating the batteries 101. In this respect, the two batteries 101 are arranged in a compact and efficient configuration.

The embodiments discussed above may be modified in various ways. In the present embodiment, the electric motor 60 serving as the drive source is attached so as to be tilted obliquely in the downward direction. However, regardless of the attachment direction of the electric motor, an attachment and arrangement configuration of the batteries 101 according to the present invention may, for example, be configured to be tilted with regard to the up-to-down moving direction of the cutting device main body 50 in order to obtain a similar effect.

Furthermore, in the exemplified embodiments, two batteries 101 are attached.

However, when only one battery is to be used, operability for attaching and detaching the battery can also be improved by tilting the attachment direction of the battery in the obliquely downward direction such that the cutting device main body 50 is not easily moved in the up-to-down direction during attachment.

Furthermore, in the above-discussed embodiments, the tabletop cutting device is exemplified. However, the present invention can be applied to stationary and/or non-mobile cutting devices used for cutting metal. Furthermore, the cutting blade 51 is exemplified as the saw blade. However, the present invention can be applied to a cutting device in which a whetstone is used for processing metal.

What is claimed is:

1. A cutting device for tabletop or stationary use, comprising:
   a table configured to receive a material to be cut;
   a cutting device main body moveably attached to the table, the cutting device main body including a cutting blade having side surfaces;
   a motor configured to drive the cutting blade and having a motor axis; and
   a cordless battery attachment portion that includes a battery attachment base that (i) receives and engages a battery and (ii) is directly mounted on an upper side of the cutting device main body with regard to the table;
   wherein:
   the battery attachment portion and the battery are configured such that the battery is attached to the battery attachment portion in a sliding direction;
   the battery is on a same side of the cutting blade as the motor and above the motor with regard to the table; and
   the sliding direction (i) is not parallel to planes that include one of the side surfaces, (ii) is tilted downward with respect to the planes and toward the motor from the cutting blade such that an upper end of the battery attachment base is toward the planes and a lower end of the battery attachment base is toward the motor and (iii) intersects the motor axis.

2. The cutting device according to claim 1, wherein a thickness direction of the battery is parallel to the motor axis or within an angle range between a parallel direction and a vertical direction.

3. The cutting device according to claim 1, further comprising a second battery structured to be attached to the cutting device main body in the sliding direction, the batteries being arranged side by side in a front-to-rear direction.

4. The cutting device according to claim 1, wherein the motor axis is perpendicular to the sliding direction.

5. The cutting device according to claim 1, wherein a portion of the battery closest to the cutting direction is spaced farther from the table than a portion of the battery farthest from the cutting direction.

6. The cutting device according to claim 1, wherein a portion of the battery is positioned farther from the table than a motor housing.

7. The cutting device according to claim 1, wherein the battery attached to the battery attachment portion is above a carrying handle.

8. A cutting device, comprising:
   a supporting base portion;
   a cutting device main body structured to pivot about a pivot axis with regard to the supporting base portion;
   a cordless battery attachment portion that is directly mounted on an upper side of the cutting device main body and has a primary battery support surface that is (i) configured to receive and engage a battery and (ii) is not parallel to a plane perpendicular to the pivot axis;

a cutting blade configured to cut a workpiece in a cutting direction perpendicular to the pivot axis and having side surfaces; and a motor configured to rotate the cutting blade about a blade rotation axis parallel to the pivot axis, the motor having a motor axis, wherein:

the battery attachment portion is structured to receive a battery slid along the primary battery support surface;

the battery is on a same side of the cutting blade as the motor; and a sliding direction of the battery (i) is not parallel to the plane, (ii) is tilted downwards in a direction perpendicular to the cutting direction and toward the motor from the cutting blade such that an upper end of the primary battery support surface is toward the cutting blade and a lower end of the primary battery support surface is toward the motor, and (iii) intersects the motor axis.

9. The cutting device according to claim 8, wherein the motor axis is perpendicular to the primary battery supporting surface.

10. The cutting device according to claim 8, wherein the battery attachment portion is positioned to pivot about the pivot axis when the cutting device main body pivots about the pivot axis.

11. The cutting device according to claim 8, wherein the primary battery supporting surface is:
    parallel to the pivot axis, or
    tilted so as to be between parallel to the pivot axis and perpendicular to the pivot axis.

12. The cutting device according to claim 8, wherein the battery attachment portion is nearer the pivot axis than the motor.

\* \* \* \* \*